United States Patent [19]

Nagel et al.

[11] Patent Number: 5,481,399

[45] Date of Patent: *Jan. 2, 1996

[54] IN-LINE TWO-STAGE ERBIUM DOPED FIBER AMPLIFIER SYSTEM WITH IN-BAND TELEMETRY CHANNEL

[75] Inventors: Jonathan A. Nagel, Freehold; Samia M. Bahsoun, Bradley Beach, both of N.J.

[73] Assignee: AT&T Corp., Murray Hill, N.J.

[*] Notice: The term of this patent shall not extend beyond the expiration date of Pat. No. 5,394,265.

[21] Appl. No.: 368,509

[22] Filed: Jan. 3, 1995

Related U.S. Application Data

[63] Continuation of Ser. No. 142,754, Oct. 25, 1993, Pat. No. 5,394,265.

[51] Int. Cl.$^6$ .............................. H01S 3/17; H01S 3/06; H04B 10/00
[52] U.S. Cl. ............................................ 359/341; 359/177
[58] Field of Search ...................... 359/110, 114, 359/133, 177, 341

[56] References Cited

U.S. PATENT DOCUMENTS

| | | | |
|---|---|---|---|
| 4,673,270 | 6/1987 | Gordon | 359/110 |
| 4,899,043 | 2/1990 | Mochizuki et al. | 250/227 |
| 4,910,727 | 3/1990 | Fussgager | 359/177 |
| 4,933,990 | 6/1990 | Mochizuki et al. | 359/177 |
| 4,972,513 | 11/1990 | Mochizuki et al. | 359/177 |
| 5,136,420 | 8/1992 | Inagabi et al. | 359/341 |
| 5,229,876 | 7/1993 | Fatebi et al. | 359/341 |
| 5,280,549 | 1/1994 | Barnard et al. | 359/114 |

FOREIGN PATENT DOCUMENTS

| | | |
|---|---|---|
| 1056773 | 12/1991 | China. |
| 0440276 | 1/1991 | European Pat. Off.. |
| 0449475 | 3/1991 | European Pat. Off.. |
| 5347449 | 12/1993 | Japan. |

OTHER PUBLICATIONS

Babsour et al, Proc. SPIE, vol. 1789, pp. 260–267, Sep. 11, 1992, Mtg.

Nakazawa, M.; Jour. of Appl. Phys. Japan, vol. 59, #9, 1990, pp. 1175–1191.

IEEE Photonics Technology Letters, vol. 5, No. 7, Jul. 1993, New York US pp. 773–775, A. Yu et al. "Analysis of Optical Gain Enhanced Erbium–Doped Fiber Amplifiers Using Optical Filters".

*Primary Examiner*—Nelson Moskowitz

[57] ABSTRACT

The present invention is an in-line multi-stage erbium doped fiber amplifier system for use in fiber optic communication systems. The system comprises two cascaded erbium doped fiber amplifiers (12), (14) separated by an drop/add device (20) for filtering out the amplifier spontaneous emission noise and the existing telemetry channel and for adding a new telemetry channel before the second amplifier (14). The invention also provides a method for providing a telemetry signal to in-line erbium doped fiber amplifier sites without affecting the signal capacity of the system, and also provides a method for monitoring the performance of a link in an optical fiber communication system.

10 Claims, 4 Drawing Sheets

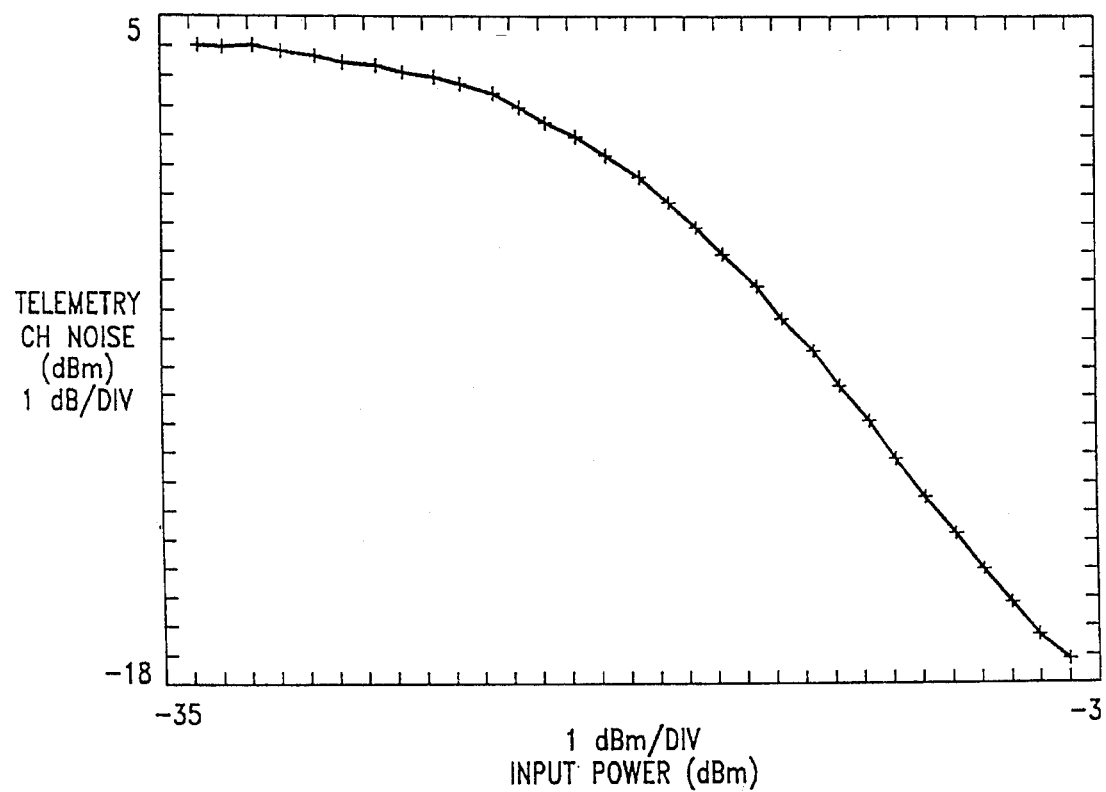

IN-LINE TWO-STAGE ERBIUM DOPED FIBER AMPLIFIER SYSTEM WITH IN-BAND TELEMETRY CHANNEL

This is a continuation, of application Ser. No. 08/142,754, filed Oct. 25, 1993, now U.S. Pat. No. 5,394,265.

BACKGROUND OF THE INVENTION

I. Field of the Invention

This invention pertains to doped fiber amplifiers for in-line use in fiber optic communication systems. More particularly, the present invention pertains to a two-stage in-line erbium doped fiber amplifier (EDFA) system for adding and dropping telemetry signals from a fiber optic line. Most particularly, the present invention pertains to a two-stage in-line EDFA system containing a filter for removing an existing telemetry signal from a fiber optic communication line and a means for adding a new telemetry signal to a fiber optic communication line without affecting the data carrying capacity of the line. In addition, this invention pertains to a method of monitoring the performance of fiber optic communication systems and for locating faults within such systems.

II. Background Art

Commercially available regenerated fiber optic communication systems use a plurality of regenerators, which include receiver/transmitter pairs and accompanying electronic processing circuitry. The regenerators are positioned between links in an optical fiber line which, when combined, form a chain, and regenerate the signal carried on the optical fiber because the signal suffers attenuation as it travels down the chain. The receiver stage of a regenerator receives the optical data carried on the optical fiber whereupon the data is demultiplexed and converted to digital electronic signals for processing. The processing usually includes filtering out the noise in the signals and re-timing the signals. Once the signals are processed, they are multiplexed, amplified, converted back to optical data, and then re-transmitted by the transmitter stage of the regenerator. The newly transmitted data will travel along the next link until it reaches the next regenerator. In such systems, the electronic processing circuitry is also used to monitor the performance of the system by monitoring the converted optical signal as well as the receiver and transmitter stages of the regenerators.

As optical signals travel between links in a fiber optic system, the signals suffer attenuation, partly as a result of inherent optical fiber characteristics such as bending losses, connection losses, etc. Thus, in optical regenerated systems, the distance between adjacent regenerators is limited so that the optical signals will be of sufficient strength to be processed upon reaching the next regenerator, whereupon the optical signals are again demultiplexed, converted to electric signals and cleaned up by removing noise. The electric signals are then amplified, re-timed, converted back to optical signals and re-transmitted. This results in the need for many regenerators, thereby increasing the cost of such systems.

The use of erbium doped fiber amplifiers (EDFAs) as replacements for regenerators in fiber optic systems is well known to those of ordinary skill in the art. EDFAs optically amplify the signal carried on the optical fiber. Such optically amplified systems are analog and not digital. Therefore, the information bits that are used for telemetry and performance monitoring in the digital regenerated systems described above are not available. In addition, EDFAs generate amplifier spontaneous emission (ASE) noise which can cause degradations in the system, especially as the ASE noise is further amplified by subsequent EDFAs in the chain. Thus, it would be beneficial in fiber optic communication systems using EDFAs to have a telemetry signal transmitted along with the data signal for transporting telemetry data and monitoring the performance and various characteristics of a system without the telemetry signal adversely impacting the data carrying capacity of the system.

Accordingly, it is an object of the present invention to provide a two-stage EDFA system for use in regenerated fiber optic communication systems for adding and dropping a telemetry signal without affecting the data carrying capacity of the communication system.

It is a further object of the present invention to provide a two-stage EDFA system comprising a filter for removing the forward propagating and backward propagating amplifier spontaneous emission noise generated by the EDFAs, thereby increasing the signal to noise ratio of the communication system.

It is still a further object of the present invention to provide a method for adding and dropping a telemetry signal from an optical fiber communication system as well as a method for monitoring system performance and fault location.

Other objects will become apparent as the following description proceeds.

The foregoing as well as additional details of the present invention will be more fully apparent from the following detailed description and annexed drawings of the presently preferred embodiment thereof.

SUMMARY OF THE INVENTION

Broadly speaking, the present invention is a two-stage doped fiber amplifier system with an in-band telemetry channel for use in optical fiber communication systems. The two-stage system comprises an optical fiber carrying a signal comprising a first telemetry signal and a data signal, and a first doped fiber amplifier disposed in-line with the optical fiber for amplifying the signal. A filter is disposed at the output of the first amplifier for filtering the signal so that the first telemetry signal is removed from the data signal. Means are provided for adding a second telemetry signal to the data signal, thereby forming a second signal which is then amplified by a second doped fiber amplifier. Means is also provided for powering the first and second doped fiber amplifiers.

In the preferred embodiment, the first and second amplifiers are erbium doped fiber amplifiers. In addition, the filter and the adding means are incorporated in a single 4-port device. Furthermore, the first amplifier acts as a pre-amplifier which saturates the second amplifier.

The invention also provides a method for monitoring the performance of a link in an optical fiber communication system by measuring, at the output of the first amplifier, the amplifier spontaneous emission noise power at the carrier wavelength of the telemetry signal and determining the input signal to the first amplifier by utilizing a predetermined relationship between the gain of the input stage of the first amplifier and the measured noise power.

BRIEF DESCRIPTION OF THE DRAWINGS

FIG. 4 is a graph of the telemetry signal noise power -vs- the signal input power of the first amplifier.

DETAILED DESCRIPTION OF THE PREFERRED EMBODIMENT

Figure 1:
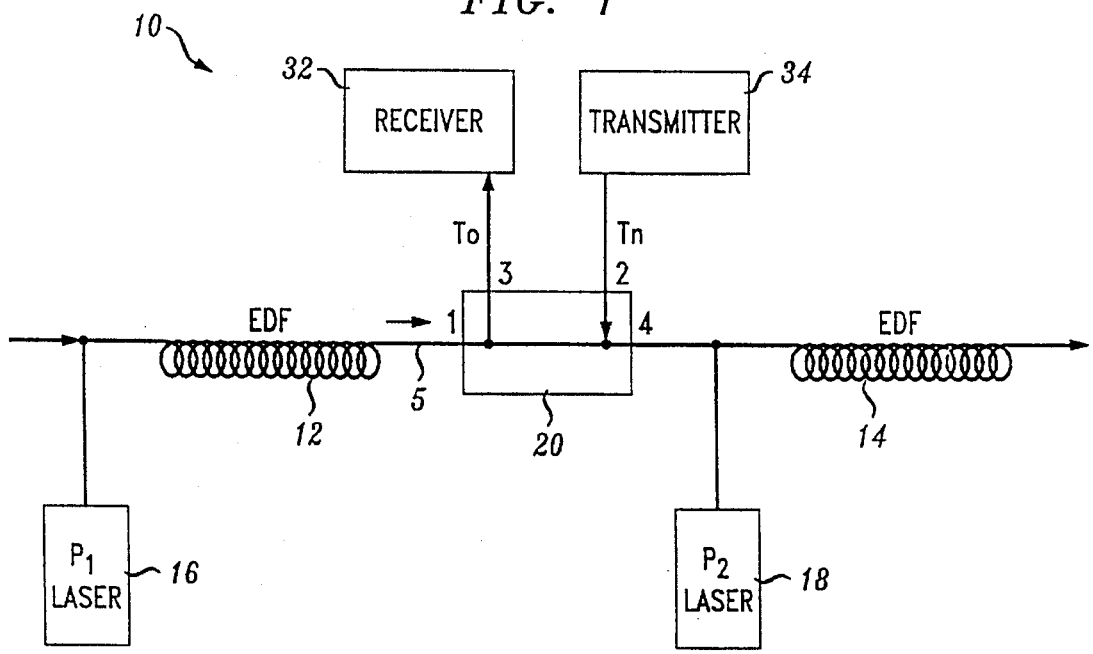
FIG. 1 is a schematic representation of a two-stage erbium doped fiber amplifier system in accordance with the present invention.

Referring now to the drawings and initially to FIG. 1, the system in accordance with the present invention is generally designated by the reference numeral 10. The system 10 has a first EDFA 12 disposed in-line with an optical fiber 5 carrying a signal comprised of a telemetry signal and a data signal carrying data. The first EDFA 12, which is powered by a first pump laser 16, amplifies the signal carried by the optical fiber 5. As shown, the system contains a drop/add device 20 and a second EDFA 14, powered by a second pump laser 18, which amplifies the existing signal carried by the optical fiber 5. The first EDFA 12 functions as a preamplifier for the system 10 and the second EDFA 14 functions as a power amplifier.

We have learned that the small signal gain peak of a single stage doped fiber amplifier occurs at a specific value $g_s$, wherein the gain peak of cascaded doped fiber amplifiers occurs at a different specific value $g_t$. Thus, for example, the small signal gain peak of a single stage EDFA is at 1532 nm. However, when two or more of the two-stage amplifiers are cascaded as in the present invention, the gain peak occurs at 1560 nm. We have also learned that the amplified spontaneous emission (ASE) noise peak for a single EDFA occurs at the small signal gain peak, i.e. 1532 nm.

Utilizing these characteristics in accordance with the present invention, the data signal occupies the gain region near the gain peak for the cascaded pair or two stage amplifier $g_t$, while the telemetry signal occupies the single stage gain region $g_s$. Thus, for example, and as is currently preferred in accordance with the present invention, the data signal carried on the optical fiber 5 occupies the gain region near the gain peak for a cascaded pair of EDFAs, i.e. 1545–1560 nm. The telemetry signal, on the other hand, occupies the gain region near the gain peak for a single EDFA, i.e. 1530–1540 nm, which region also contains the ASE noise peak.

The signal measured at the fiber region between the first EDFA 12 and the second EDFA 14 will contain not only a telemetry signal and a data signal but, also, forward propagating ASE noise emitted by the first EDFA 12 and backward propagating ASE noise emitted by the second EDFA 14. Thus, and as more fully explained below, the placement of the drop/add device 20 between the first EDFA 12 and the second EDFA 14 will allow for the forward and backward propagating ASE noise to be removed from the signal, thereby providing a clean signal which is then amplified by the second EDFA 14.

Figure 1A:
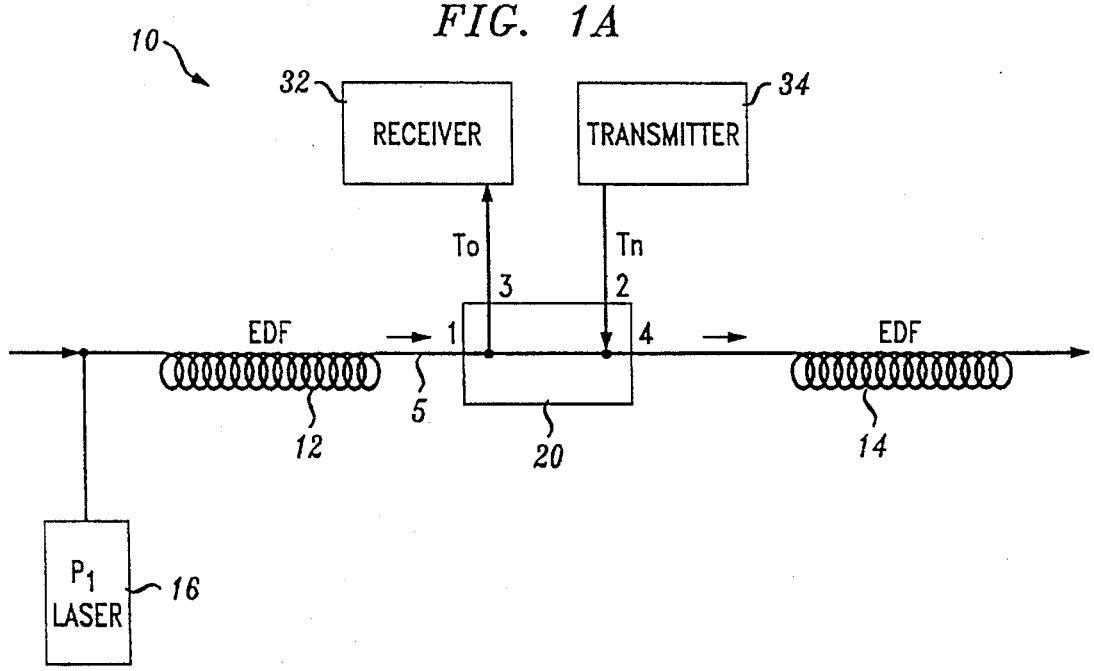
FIG. 1A is a schematic representation of an alternate embodiment of a two-stage erbium doped fiber amplifier system in accordance with the present invention.
Figure 2:
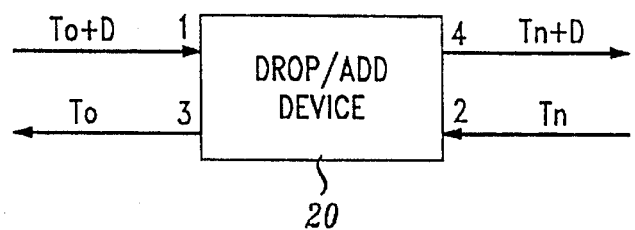
FIG. 2 is a block diagram of the drop/add device used in the present invention.
Figure 2A:
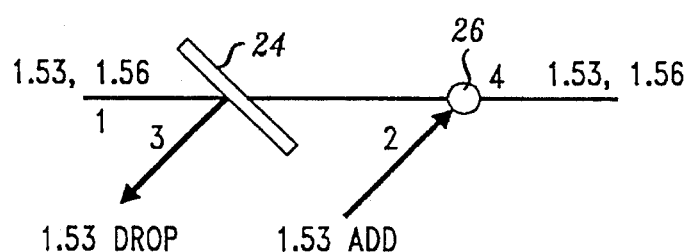
FIGS. 2A–2C show alternate embodiments of the block diagram of FIG. 2.
Figure 2B:
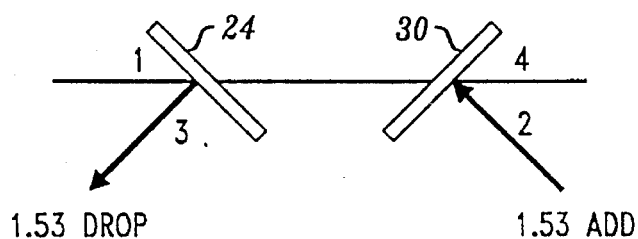

As shown in FIG. 2, the drop/add device 20 is preferably a 4-port device. Port 1 receives a signal comprised of an existing 1532 nm telemetry signal, shown as $T_o$, and a 1560 nm data signal shown as D. Port 3 drops the telemetry signal $T_o$ which, as shown in FIGS. 1 and 1A, is sent to a receiver 32 for processing. Port 2 adds a new 1532 nm telemetry signal $T_n$, which is transmitted by transmitter 34, to the data signal D and Port 4 outputs the data signal D along with new telemetry signal $T_n$.

Referring next to FIGS. 2A–2C and 3A–3B, the drop/add device 20 of the system 10 will now be described. The drop/add device 20 is comprised of a drop element, such as a filter 24, and an add element, such as a wave division multiplexer 30 (see FIG. B) or a standard passive 3 dB coupler 26 (see FIG. 2A). The filter 24 is a standard noise filter having the capability of passing the data signal and rejecting the 1532 nm ASE noise peak which, as explained above, also contains the telemetry signal. Either a bandpass filter or a notch filter—having the notch centered at the 1532 nm ASE noise peak—can be used. A bandpass filter having the characteristics shown in FIG. 3A will provide maximum noise filtering but will minimize the signal channel bandwidth which, of course, is not desired in most communication systems. On the other hand, using a notch filter having the characteristics shown in FIG. 3B will provide less noise filtering than a bandpass filter but will not affect the bandwidth of the signal channel. The use of a bandpass filter is presently preferred.

The new telemetry signal can be added, via an adding device, to the data channel in a manner well known to those of ordinary skill in the art. For example, a standard passive 3 dB coupler 26 or a wave division multiplexer 30 can be used. It should be noted that, while the addition of a new telemetry signal having a carrier wavelength at 1532 nm is contemplated, other signals in addition to the telemetry signal can be added by the adding device as well.

Figure 2C:
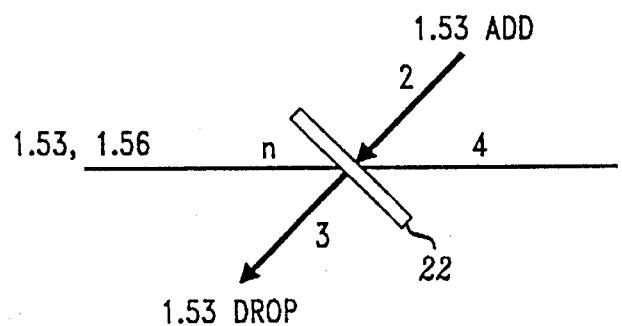
Figure 3A:
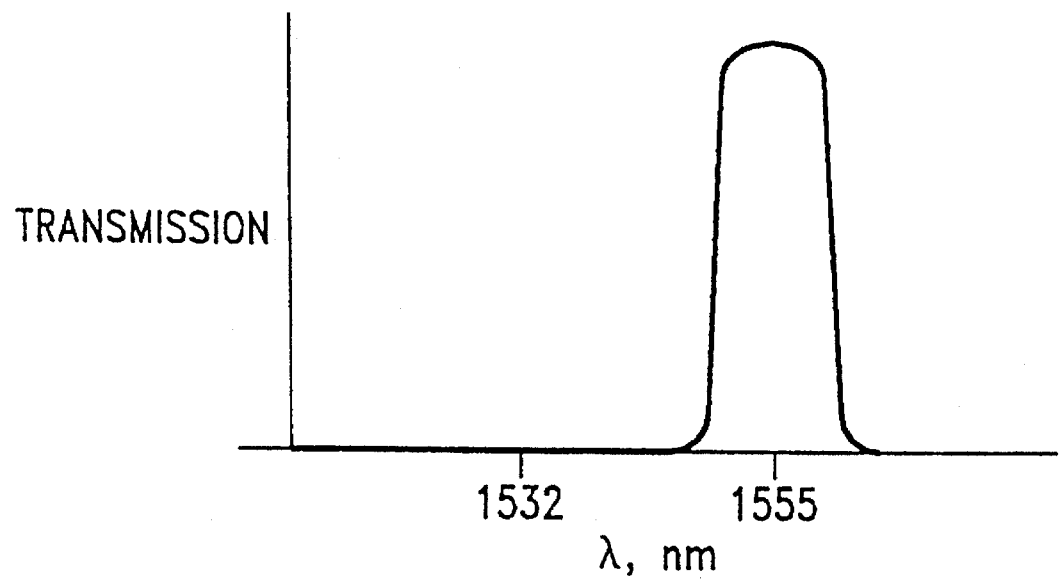
FIGS. 3A and 3B are transmission -vs- wavelength graphs of alternate embodiments of the filter used in the present invention.
Figure 3B:
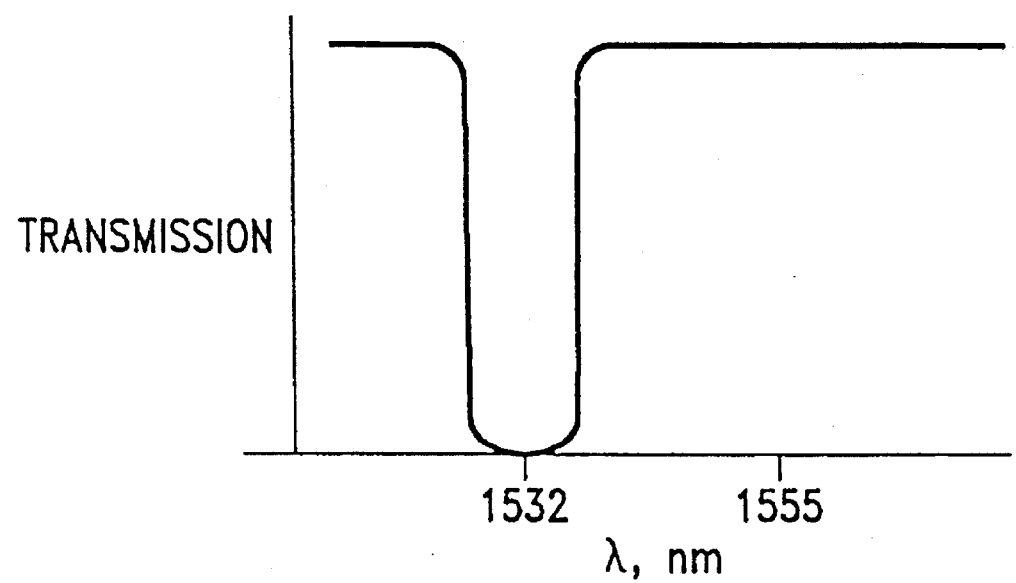

In the preferred embodiment, which is shown in FIG. 2C, the drop/add device 20 is a 4-port combination multiplexer/demultiplexer device 22 that is essentially a combination noise filter and wave division multiplexer. As explained above, Port 1 of the device 22 receives the incoming signal and port 3 drops the 1532 nm signal containing the telemetry data and ASE noise. The telemetry data is then directed to receiver 32 for processing the telemetry in a manner well known to those of ordinary skill in the art. Port 2 will add the new 1532 nm telemetry signal, which is generated by transmitter 34, to the data signal and the remaining combined signal is then output to optic fiber 5 via port 4, whereupon it is amplified by the second EDFA 14.

As discussed above, the telemetry signal occupies the gain region near the ASE noise peak. Thus, to distinguish the telemetry signal from the ASE noise, the telemetry signal is modulated in a manner well known to those of ordinary skill in the art, such as by simply turning the telemetry signal on and off or by using a modulated laser. Thus, when the ASE noise, along with the telemetry signal, is filtered out by the drop/add device 20, the telemetry signal can be isolated from the noise and routed to telemetry receiver 32 for processing.

The two-stage erbium doped fiber amplifier system of the present invention provides additional benefits to a fiber optic communication system. Specifically, and as stated above, the first EDFA 12 acts as a pre-amplifier for the second EDFA 14. Also as explained above, the gain peak of a single amplifier occurs at 1532 nm but the gain peak for two cascaded EDFAs occurs near 1560 nm. Thus, as the data signal is amplified by both EDFAs, the 1560 nm region is used to carry the data. The incoming telemetry signal is amplified by only the first EDFA 12 and, thus, the 1532 nm region is used for telemetry. In addition, as the second EDFA 14 is saturated by the first EDFA 12, the gain of the newly added telemetry signal can be large without affecting the data carrying capacity of the data channel. This system accordingly provides for a strong telemetry signal with a high bit rate transmission.

The present invention also improves the signal-to-noise ratio of the fiber optic communication system. The signal to noise ratio can be improved by either increasing the signal level or reducing the noise level. The drop/add device 20 of the present invention improves the signal-to-noise ratio by doing both. In conventional systems, forward propagating ASE noise tends to accumulate and further saturate the other EDFAs down the chain, thereby reducing the gain of the communication system. However, in accordance with the present invention, the drop/add device 20 blocks the forward propagating 1532 nm ASE noise, thereby resulting in higher gain and higher signal levels at the end of the chain. In addition, the drop/add device 20 also blocks the backward propagating ASE noise peak generated by the second EDFA 14 from entering the first EDFA 12. This backward propagating noise would have been amplified by the first EDFA 12, thereby increasing the input level of the first EDFA 12 and significantly increasing the amplifier noise figure. Thus, the drop/add device 20 reduces the amplifier noise which results in an increased signal-to-noise ratio at the end of the chain.

The present invention can also be employed to provide a method for monitoring the performance of the EDFAs in a chain of fiber optic links as well as to locate faults in the communication system. This method is based on the principle that the ASE noise power at the telemetry signal wave length, i.e. 1532 nm, is related to the gain of the input stage of the first EDFA 12 which, as explained above, acts as a pre-amplifier. As used in the present invention, the pre-amplifier receives a signal greater than −24 dBm and thus is operated in slight saturation. As such, the input stage gain of the pre-amplifier 12 is set by the input signal level of the pre-amplifier. As shown in FIG. 4, the relationship between the telemetry channel noise in the range of −3 dBm to −24 dBm and the signal channel input power of the pre-amplifier 12 is nearly linear. Thus, by measuring the level of the ASE noise at port 3 of the drop/add device 20, the input signal level of the pre-amplifier 12 can be estimated. Note that this is done without the use of couplers or splitters in the input signal path which would reduce system gain. This feature will detect reductions in input signal levels and may also be used as part of a general fault location scheme.

Although we have herein shown and described the currently preferred embodiment of the invention, various changes and modifications will be readily apparent to those of ordinary skill in the art who read the foregoing description. For example, other doped fiber amplifiers can be used, such as Praseodymium doped fiber amplifiers, provided the signals are transmitted at the appropriate wavelengths and the filter 24 is designed to filter out the appropriate signals. In addition, and as shown in FIG. 1A, a single pump laser positioned at the input of the first EDFA 12 for powering both EDFAs can be employed instead of two pump lasers, so long as the filter 24 2n the drop/add device 20 is designed to allow the laser light to pass into the second EDFA 14. As these as well as further changes and modifications are intended to be within the scope of the present invention, the foregoing description should be construed as illustrative and not in a limiting sense, the scope of the invention being defined by the following claims.

We claim:

1. A two-stage doped fiber amplifier system for use in optical fiber communication systems including an optical fiber for carrying a signal comprising a data signal and a first telemetry signal having a predetermined carrier wavelength, said doped fiber amplifier system comprising:

a first doped fiber amplifier for disposal in-line with the optical fiber for amplifying the signal and having an input and an output, said first amplifier operatively generating an inherent spontaneous emission noise signal having a noise peak occurring at said predetermined carrier wavelength;

a filter disposed at the output of said first amplifier for filtering out said predetermined carrier wavelength so as to remove from the signal the first telemetry signal and at least said noise peak of the spontaneous emission noise signal while passing the data signal through the filter;

means for adding a second telemetry signal having said predetermined carrier wavelength to the passed-through data signal for forming a second signal to be carried by said optical fiber;

a second doped fiber amplifier for disposal in-line with the optical fiber carrying the second signal for amplifying the second signal and having an input and an output; and means for supplying optical power to said first and second amplifiers.

2. A two-stage doped fiber amplifier system in accordance with claim 1, wherein said first and second doped fiber amplifiers are erbium doped fiber amplifiers.

3. A two-stage doped fiber amplifier system in accordance with claim 2, wherein said filter is configured for rejecting all wavelengths not used by said data signal.

4. A two-stage doped fiber amplifier system in accordance with claim 2, wherein said filter is a notch filter centered at said predetermined carrier wavelength.

5. A two-stage doped fiber amplifier system in accordance with claim 2, wherein said adding means comprises a coupler disposed in-line with said optical fiber for adding said second telemetry signal to said data signal.

6. A two-stage doped fiber amplifier system in accordance with claim 2, wherein said adding means comprises a wave division multiplexer for adding said second telemetry signal to said data signal.

7. A two-stage doped fiber amplifier system in accordance with claim 2, wherein said adding means and said filter comprise a combination wave division multiplexer and de-multiplexer device for separating said first telemetry signal from said data signal and for adding said second telemetry signal to said data signal.

8. A two-stage doped fiber amplifier system in accordance with claim 2, wherein said means for supplying optical power comprises an optical power source for powering said first and second amplifiers.

9. A two-stage doped fiber amplifier system in accordance with claim 8, wherein said optical power source comprises a first optical power source for powering said first amplifier and a second optical power source for powering said second amplifier.

10. A two-stage doped fiber amplifier system in accordance with claim 9, wherein said first and second optical power sources further comprise first and second pump lasers which emit light at a frequency other than said predetermined carrier frequency.

\* \* \* \* \*